S. L. SIMPSON.
VEHICLE WHEEL.
APPLICATION FILED JAN. 29, 1917. RENEWED OCT. 21, 1918.
1,292,111.
Patented Jan. 21, 1919.
3 SHEETS—SHEET 2.
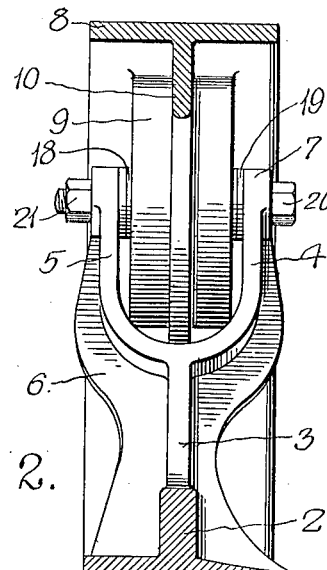
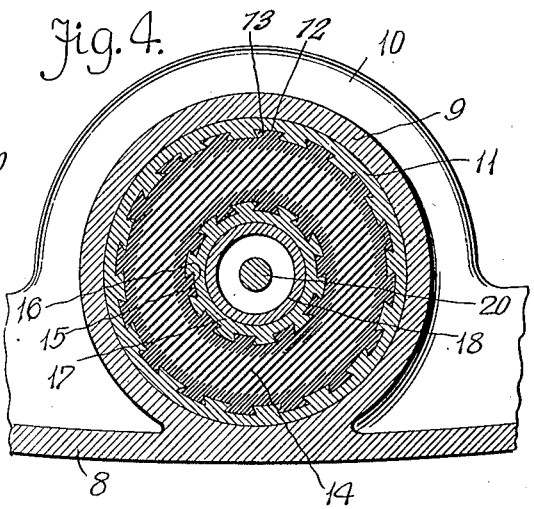
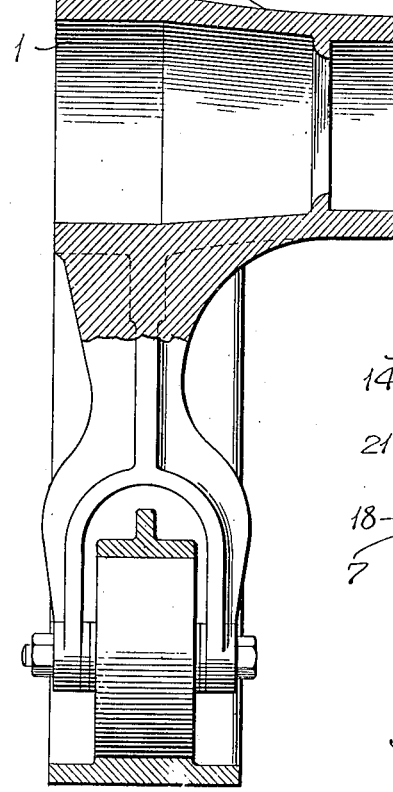
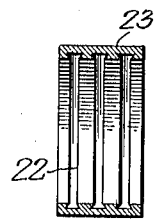
Inventor
Selden L. Simpson,
Witness
Chas. W. Stauffiger
Karl H. Butler
By
Bartlett & Bartlett
Attorneys

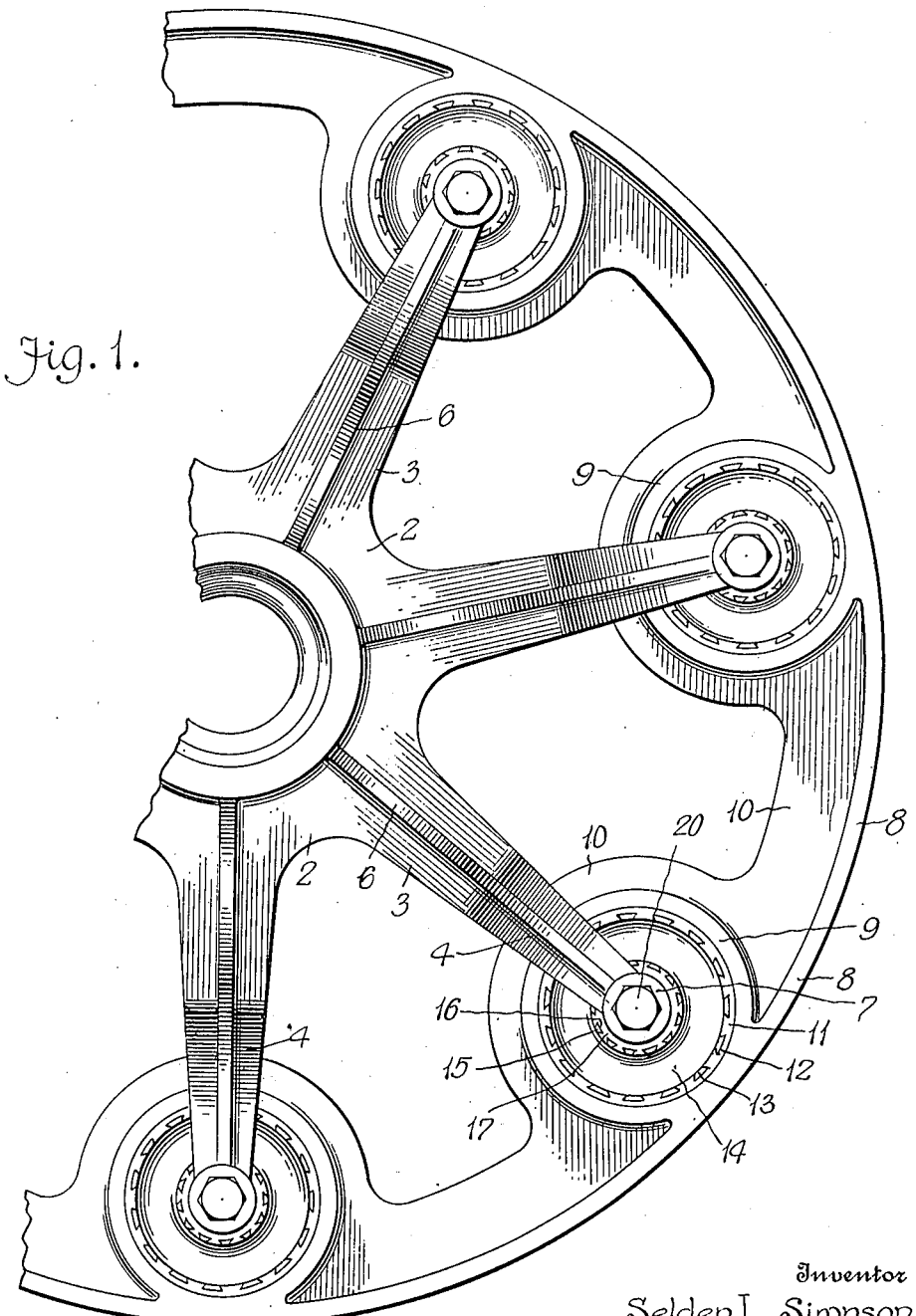

UNITED STATES PATENT OFFICE.

SELDEN L. SIMPSON, OF DETROIT, MICHIGAN, ASSIGNOR OF ONE-HALF TO WILLIAM E. CURRIE, OF DETROIT, MICHIGAN.

VEHICLE-WHEEL.

1,292,111.      Specification of Letters Patent.      Patented Jan. 21, 1919.

Application filed January 29, 1917, Serial No. 145,254. Renewed October 21, 1918. Serial No. 259,142.

*To all whom it may concern:*

Be it known that I, SELDEN L. SIMPSON, a citizen of the United States of America, residing at Detroit, in the county of Wayne and State of Michigan, have invented certain new and useful Improvements in Vehicle-Wheels, of which the following is a specification, reference being had therein to the accompanying drawings.

This is an improvement in connection with a vehicle wheel disclosed by my Patent No. 1,141,429, granted June 1, 1915.

In this patent there is shown and described a vehicle wheel wherein yieldable resilient bodies are interposed between the rim of the wheel and spokes thereof for cushioning and yieldably supporting the hub portion of the wheel, to insure easy riding of the vehicle upon irregular and rough roads or surfaces.

My present invention aims to simplify the construction of my former wheel and provide a more durable structure wherein the parts may be easily assembled and manufactured at less cost.

Matters relating to my invention will be hereinafter described in detail and then claimed, and reference will now be had to the drawing, wherein—

Figure 1 is a side elevation of a portion of the vehicle wheel;

Fig. 2 is a cross sectional view of the same, partly in elevation;

Fig. 3 is an enlarged transverse cross sectional view of one of the yieldable or resilient bodies of the wheel;

Fig. 4 is a longitudinal sectional view of the same;

Fig. 5 is a detailed sectional view of a detached band, illustrating a slight modification of the invention;

Figure 6:
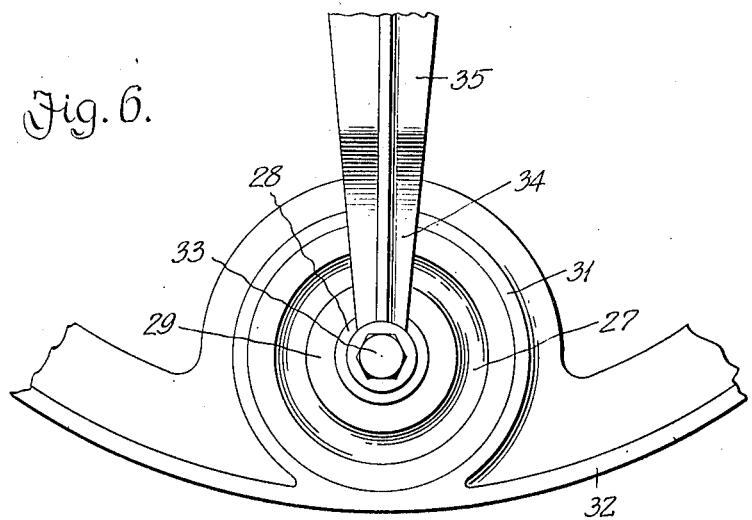
Fig. 6 is a side elevation of a portion of a wheel illustrating a slight modification of my invention.

In the drawings, 1 denotes a hub having a web portion 2 providing radiating spokes 3. The outer ends of said spokes are forked or bifurcated in a plane transverse to the plane of the wheel to provide opposed arms 4 and 5. The web 2, spokes 3 and arms 4 and 5 are strength reinforced or braced by side ribs 6, said ribs merging into the outer ends of the arms 4 and 5 which terminates in apertured bosses 7.

8 denotes a rim or felly member and the inner wall of said rim, at intervals, is provided with integral transverse cylindrical housings 9. The inner wall of the rim 8 and the periphery of each housing are strength reinforced or braced by a web or rib 10, and shrunk or otherwise fixed within the housing is an outer metallic band 11 provided with transverse dove-tailed grooves 12. These grooves receive transverse dove-tailed tongues 13 on the periphery of a soft rubber body or cushioning member 14, said body being in the form of a sleeve having the bore thereof provided with transverse inwardly projecting tongues 15 to engage in dove-tailed grooves 16 provided therefor in the periphery of an inner metallic band 17. The dove-tailed tongues of the body 14 are hardened by vulcanizing or otherwise and such hardened surfaces of the body 14 have been indicated in Fig. 3 of the drawing.

Shrunk or otherwise fixed in each inner metallic band is a sleeve 18 having the ends thereof protruding from the ends of the bands 17. The ends of the sleeve 18 receive aperture caps 19 and after the housings 9 have been shifted into the forked or bifurcated ends of the spokes 3, bolts 20 are placed in the bosses 7 of the arms 4 and 5 of the spokes. The bolts 20 extend through the bosses of the arms 4 and are screwed into the bosses 7 of the arms 5, said bolts being locked in position by jamb nuts 21 or other locking means placed on the threaded ends of the bolts against the bosses of the arms 5.

After the housings 9 of the rim 8 have been provided with resilient bodies, the rim 8 can be positioned with the housings 9 between the ends of the spokes 3, and then shifted circumferentially to bring the housings into the forked or bifurcated ends of the spokes, whereby the apertured caps 19 will register and aline with the bosses 7 of the spokes, thus permitting of the bolts 20 being placed in position to hold the housings of the rim relative to the spokes of the hub.

The inner and outer metallic bands have been described as having the dove-tailed grooves thereof transverse to the band, but I reserve the right to provide these inner and outer bands with circumferential dove-tailed grooves 22, as shown in connection with a band 23, Fig. 5 of the drawing.

The rim 8 may be used as the tread of the wheel or the rim may be provided with a suitable tire.

Figure 7:
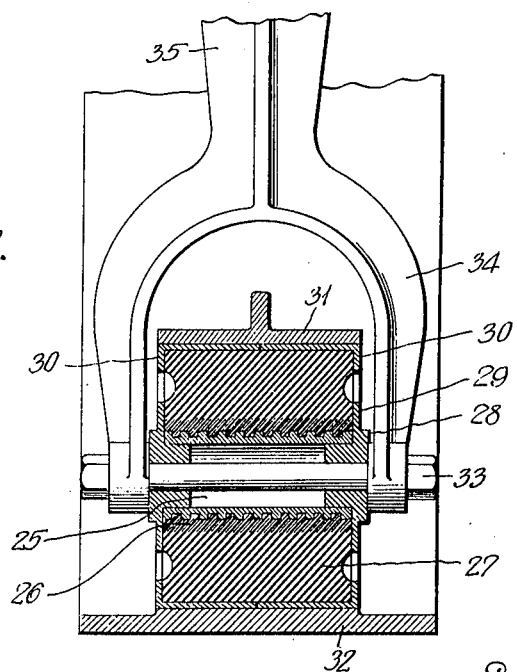
Fig. 7 is an enlarged cross sectional view of the same.

Reference will now be had to Figs. 6 and 7 showing the sleeve or band 25 that has the periphery thereof ribbed or roughened to receive the vulcanized or hardened portion 26 of a soft rubber body or cushioning member 27. Mounted in the ends of the band or sleeve 25 are apertured caps 28 provided with peripheral flanges 29 engaging the ends of the cushioning member 27. Also engaging the ends of the cushioning member 27 are confronting cup shaped members 30 and these members are mounted in a cylindrical housing 31 forming a part of a rim or felly member 32.

A bolt or tie rod 33 extends through the caps 28 and a sleeve 25 and holds the arms 34 of a spoke 35 relative to said caps.

The flanged caps 28 and the cup shaped members 30 coöperate in preventing transverse spreading of the cushioning member, said caps and cup shaped members serving as a shield or protecting device for the ends of the cushioning members.

The preferred embodiments of my invention have been illustrated, but it is to be understood that the structural elements are susceptible to such variations and modifications as fall within the scope of the appended claims.

What I claim is:—

1. In a vehicle wheel, a hub, spokes carried thereby and having the outer ends thereof forked, a rim, housings carried by said rim and extending into the forked ends of said spokes, confronting cup shaped members contacting with said housings, yieldable bodies between said members, bands in said yieldable bodies, caps in the ends of said bands and having peripheral flanges engaging the sides of said yieldable bodies, and means extending through said bands and said caps connecting said housings to the forked ends of said spokes.

2. An element of vehicle construction comprising a fixed housing, cup shaped members mounted therein, a band concentric of said members, a soft rubber body filling the space between said band and said members having the band contacting portion thereof hardened, and supporting members concentric of said band coöperating with said cup shaped members in maintaining said rubber body on said band.

In testimony whereof I affix my signature in the presence of two witnesses.

SELDEN L. SIMPSON.

Witnesses:
ANNA M. DORR,
KARL H. BUTLER.